United States Patent
Pare et al.

(10) Patent No.: US 8,731,358 B2
(45) Date of Patent: May 20, 2014

(54) MULTI-CLADDING FIBER

(76) Inventors: Claude Pare, St-Augustin-de-Desmaures (CA); Pierre Laperle, St-Augustin-de-Desmaures (CA); Huimin Zheng, Quebec (CA); Andre Croteau, Saint-Agapit (CA)

( * ) Notice: Subject to any disclaimer, the term of this patent is extended or adjusted under 35 U.S.C. 154(b) by 437 days.

(21) Appl. No.: 12/812,757

(22) PCT Filed: Jan. 17, 2008

(86) PCT No.: PCT/CA2008/000085
§ 371 (c)(1),
(2), (4) Date: Dec. 8, 2010

(87) PCT Pub. No.: WO2009/089608
PCT Pub. Date: Jul. 23, 2009

(65) Prior Publication Data
US 2011/0081123 A1    Apr. 7, 2011

(51) Int. Cl.
*G02B 6/36*     (2006.01)
*G02B 6/02*     (2006.01)
G02B 6/036     (2006.01)

(52) U.S. Cl.
CPC ........ *G02B 6/02023* (2013.01); *G02B 6/03644* (2013.01)
USPC ....................................................... 385/126

(58) Field of Classification Search
CPC ........................ G02B 6/02323; G02B 6/03644
USPC ........... 385/123, 124, 126, 127, 128, 141, 11, 385/26, 27, 28; 359/341.1, 341.3; 372/6
See application file for complete search history.

(56) References Cited

U.S. PATENT DOCUMENTS

| | | | |
|---|---|---|---|
| 5,067,793 A | 11/1991 | Bachmann et al. | |
| 5,361,319 A * | 11/1994 | Antos et al. | 385/123 |
| 5,553,185 A | 9/1996 | Antos et al. | |
| 6,349,163 B1 | 2/2002 | Antos et al. | |
| 6,445,494 B1 | 9/2002 | Nilsson et al. | |
| 6,941,053 B2 | 9/2005 | Lauzon et al. | |
| 6,954,575 B2 * | 10/2005 | Fermann et al. | 385/128 |
| 6,970,632 B2 | 11/2005 | Berkey et al. | |
| 7,050,686 B2 | 5/2006 | Farroni et al. | |
| 7,068,900 B2 | 6/2006 | Croteau et al. | |
| 7,203,407 B2 * | 4/2007 | Berkey et al. | 385/123 |
| 7,313,312 B2 | 12/2007 | Kimball et al. | |
| 7,724,422 B2 * | 5/2010 | Abramczyk et al. | 359/341.1 |
| 7,782,910 B2 * | 8/2010 | Fermann et al. | 372/6 |
| 8,189,978 B1 * | 5/2012 | Bennett et al. | 385/127 |
| 2003/0026565 A1 | 2/2003 | Anderson et al. | |
| 2003/0059187 A1 * | 3/2003 | Andrieu et al. | 385/127 |
| 2003/0152349 A1 | 8/2003 | Lauzon et al. | |
| 2005/0191017 A1 * | 9/2005 | Croteau et al. | 385/123 |
| 2006/0029343 A1 | 2/2006 | Farroni et al. | |
| 2006/0088261 A1 * | 4/2006 | Berkey et al. | 385/123 |
| 2007/0104438 A1 | 5/2007 | Varnham | |
| 2008/0025363 A1 * | 1/2008 | Yla-jarkko et al. | 372/98 |
| 2010/0195194 A1 * | 8/2010 | Chen et al. | 359/341.3 |

FOREIGN PATENT DOCUMENTS

WO    2008110668    9/2008

\* cited by examiner

*Primary Examiner* — Charlie Peng

(57) ABSTRACT

Multi-cladding optical fibers to be used in the context of fiber amplifiers and fiber lasers are described herein. Embodiments of optical fibers include a rare-earth doped core into which the signal field is to be amplified. The doped core is surrounded by multiple claddings that guide the pump field to be absorbed by the reactive core material. The first cladding has a depressed refractive index to improve high-order mode bending losses without incurring significant fundamental mode bending losses.

20 Claims, 11 Drawing Sheets

MULTI-CLADDING FIBER

FIELD

The present invention generally relates to optical fibers. More specifically, the present invention is concerned with multi-cladding optical fibers used in the context of fiber amplifiers and fiber lasers.

BACKGROUND

High-energy pulsed narrow-linewidth diffraction-limited rare-earth doped power amplifiers in the 950 to 1100 nm wavelength range and in the nanosecond regime generally require large mode area (LMA) fibers to mitigate Stimulated Brillouin scattering (SBS). However, typical LMA fibers with mode-field diameters larger than 20 µm are inherently multimode. To achieve a diffraction-limited output, several techniques are available such as low core numerical aperture, fiber coiling and selective doping.

High peak power amplification in rare-earth doped fibers suffers from nonlinear effects such as Stimulated Raman Scattering (SRS) and Stimulated Brillouin Scattering (SBS) [1, 2]. Core size and fiber length are the two parameters that are commonly varied to increase the threshold of these nonlinear effects. In the case of narrow linewidth and pulse width in the 10-ns range, SBS is the limiting factor for high peak powers. LMA fibers with core diameters of 10-15 µm yield nearly diffraction-limited output but their relatively small effective area (<200 µm$^2$) allows only moderate high peak power levels. Core diameters greater than 20 µm are interesting but since the number of modes supported by the LMA fiber increases with the core diameter, the output of such a fiber becomes multimode. Lowering the numerical aperture of the core, defined as $NA=\sqrt{n_{core}^2-n_{firstcladding}^2}$, n representing the refractive index, will reduce the number of modes, although a good control of the NA lower than 0.05 is a challenge for the MCVD (Modified Chemical Vapor Deposition) process.

Mode filtering by fiber bending is the most commonly used method to reduce the number of propagating modes in the fiber [3]. However, 100% higher-order mode suppression by this method is hard to obtain and the beam quality stays sensitive to variation in the mechanical and thermal stresses applied to the fiber.

A problem arises when relatively large core fibers are used. Indeed, the bending radii must be tightly controlled when the core size is relatively large (more than 30 microns for a typical core designed with a core numerical aperture in the range of about 0.05 to about 0.08) to minimize the bending losses of the first mode.

Another way to favor single-mode operation is to use selective doping [4-6]. In this case, the fundamental mode takes advantage of a higher gain compared to higher-order modes.

Short fiber lengths require a high concentration of rare-earth doping to achieve high gain amplification. This is often problematic since rare-earth doping increases the index of refraction. $B_2O_3$ or F can be incorporated to lower the refractive index to keep a low core NA.

DETAILED DESCRIPTION

In accordance with an illustrative embodiment of the present invention, there is provided a multi-cladding optical fiber including:

a longitudinal core having at least a portion thereof that is rare-earth doped; the core having a core refractive index;

a first cladding surrounding the longitudinal core; the first cladding having a first cladding refractive index lower than the core refractive index;

a second cladding surrounding the first cladding; the second cladding having a second cladding refractive index higher than the first cladding refractive index; and an external cladding surrounding the second cladding.

Other objects, advantages and features of the present invention will become more apparent upon reading of the following non-restrictive description of illustrative embodiments thereof, given by way of example only with reference to the accompanying drawings.

The present description refers to other documents listed at the end of the present disclosure. These documents are hereby incorporated by reference in their entirety.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

Generally stated, illustrative embodiments of the present invention are concerned with an optical fiber including a rare-earth doped core into which the signal field is to be amplified. The doped core is surrounded by multiple claddings that guide the pump field to be absorbed by the reactive core material. A first cladding surrounds the core to adjust the core NA [6-9]. The core NA can be kept as low as 0.05 even at high rare-earth concentrations (greater than about 4 wt %). The approach used herein in illustrative embodiments of the present invention increases the differential bending losses between the first mode and the higher-order modes to allow mode filtering and favor a single-mode output. Generally, this is achieved by using a first cladding having a refractive index lower than the refractive index of the second cladding.

Fiber Design

Figure 1:
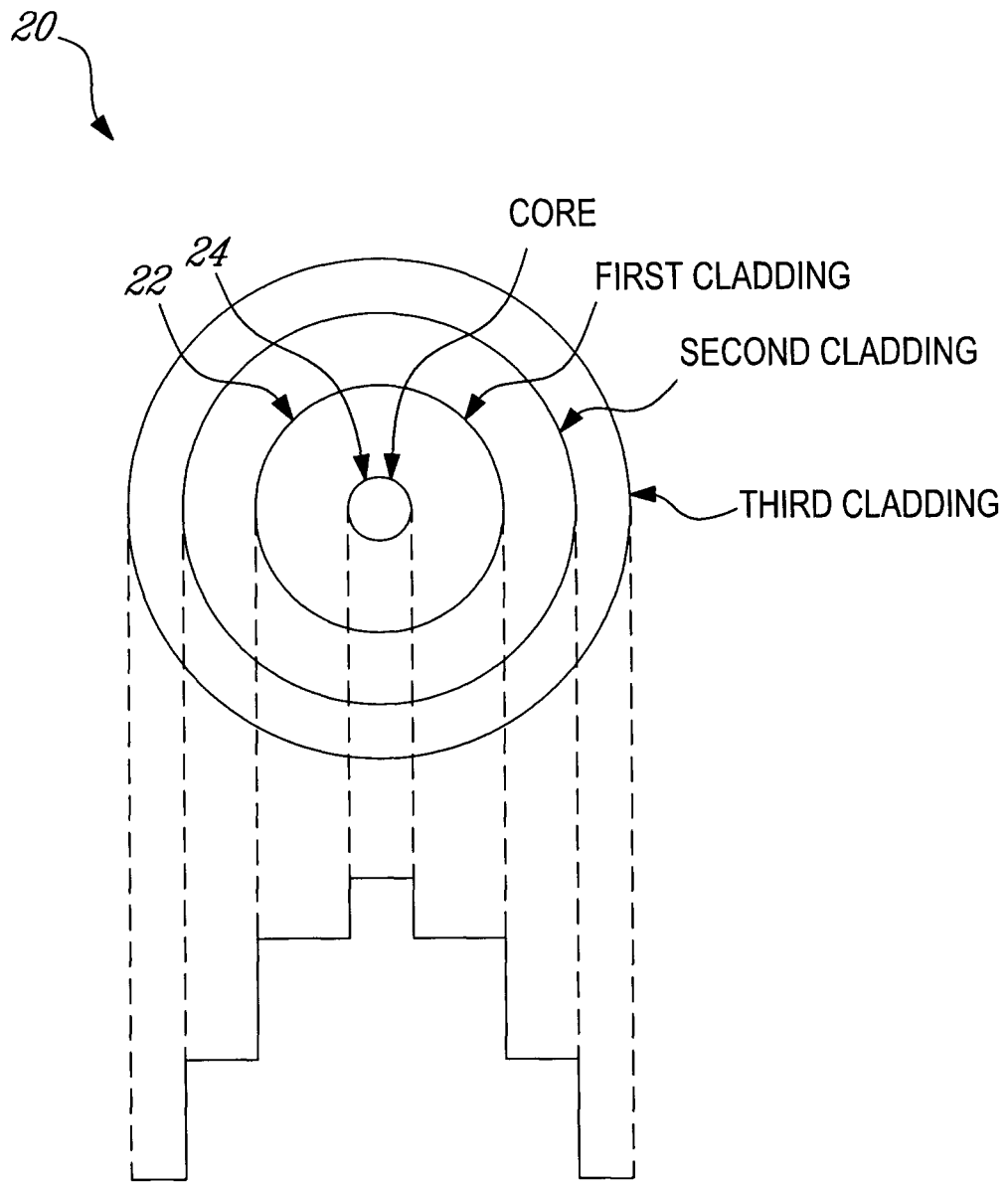
FIG. 1, which is labeled "prior art", is a sectional view of a multi-cladding optical fiber conventional multi-cladding optical fiber with a stair-like index profile.

A schematized section view and a schematic refractive index profile for a conventional multi-cladding optical fiber 20 are shown in FIG. 1. The refractive index of the first cladding 22 is adjusted to the refractive index of the core 24 (which generally depends on the rare-earth concentration thereof) to obtain the desired core NA, typically between about 0.05 and about 0.07.

To favor a single-mode output, one can rely on the commonly used approach based on differential bending losses to filter out higher-order modes. Indeed, inter-modal coupling, such as a bend-induced coupling for example, may give rise to excitation of higher-order modes from perturbations to the fundamental mode along the fiber and a final mode filtering might be necessary to improve the output beam quality.

Figure 2A:
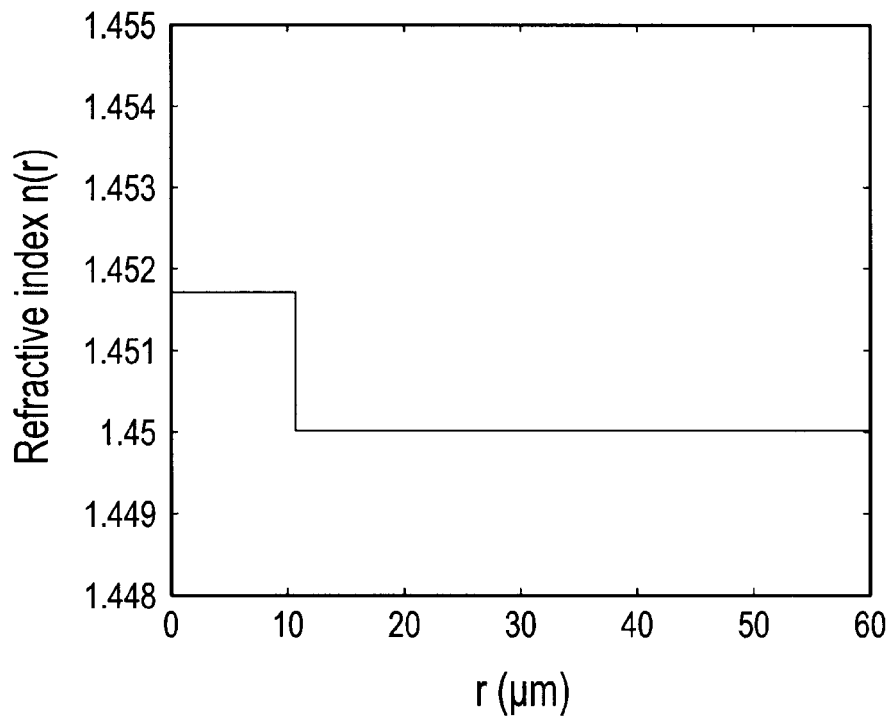
FIG. 2A, which is labeled "prior art", illustrates the refractive index profile of the core and of the first cladding of the optical fiber of FIG. 1, assuming a circular symmetry; the core diameter of 20 microns is shown with a core NA of 0.07.
Figure 2B:
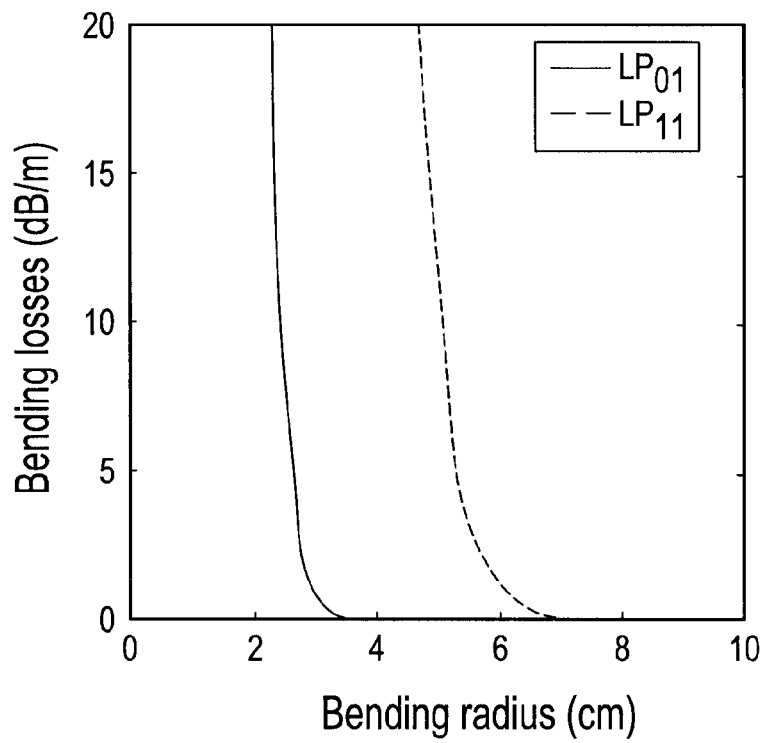
FIG. 2B, which is labeled "prior art", illustrates bending losses of the $LP_{01}$ and $LP_{11}$ modes as a function of the bending radius of the fiber of FIG. 2A.
Figure 3A:
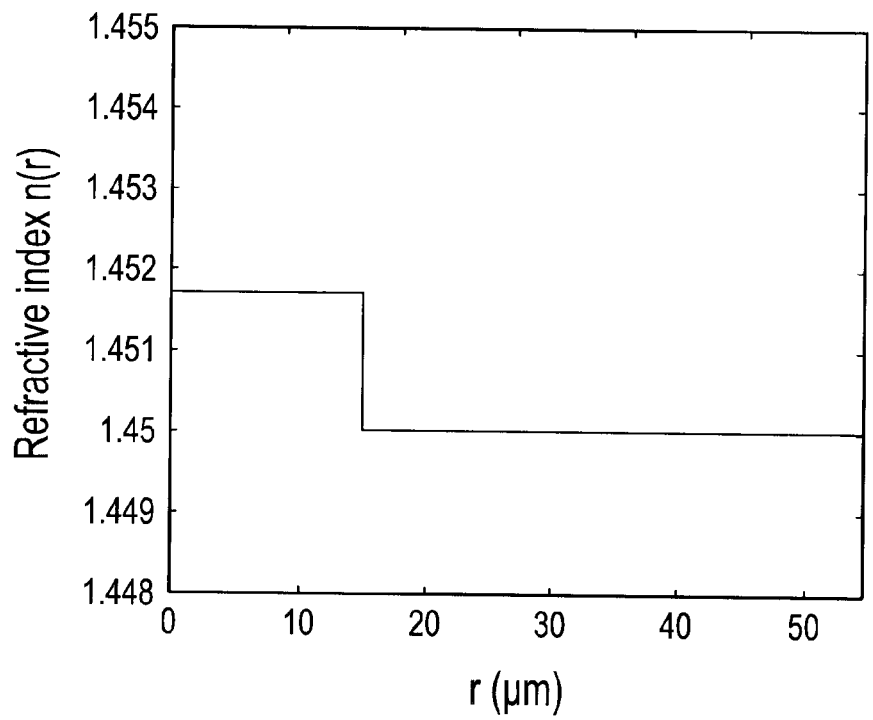
FIG. 3A, which is labeled "prior art", illustrates the refractive index profile of the core and of the first cladding of optical fiber of FIG. 1, assuming a circular symmetry; the core diameter of 30 microns is shown with a core NA of 0.07.
Figure 3B:
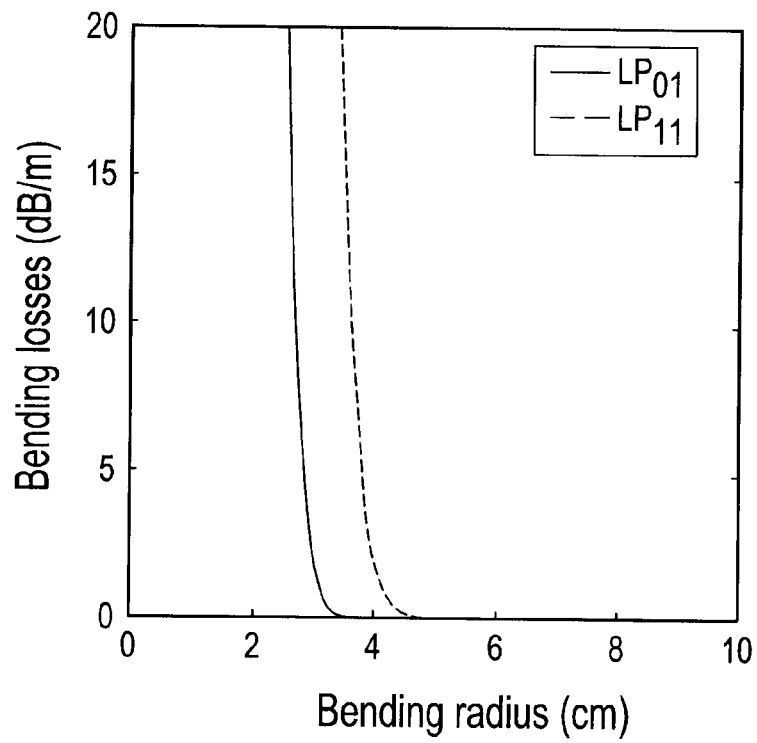
FIG. 3B, which is labeled "prior art", illustrates bending losses of the $LP_{01}$ and $LP_{11}$ modes as a function of the bending radius of the fiber of FIG. 3A.

However, the filtering efficiency of the differential bending losses technique is greatly reduced as the core size increases, simply because the higher-order modes are more and more confined within the core as the latter enlarges. FIG. 2A illustrates a typical index profile for a multi-cladding fiber with a core diameter of 20 μm and core NA of 0.07. For illustration purposes, only the core and the first cladding are shown. FIG. 2B depicts the bending losses of such a fiber design. According to FIG. 2B, this fiber would provide a margin of ~3 cm in bending radius to impart significant bending losses to the $LP_{11}$ mode while keeping these losses below 1 dB/m for the $LP_{01}$ mode, thus favoring a single-mode output. But, as shown in FIGS. 3A and 3B, enlarging the core to 30 μm would reduce this margin to less than 1 cm, which is more critical. Moreover, as discussed in Laperle et al. [6], the small bending radius required for the mode filtering makes the large core design more prone to higher-order modes excitation caused by bend-induced modal coupling.

Figure 4:
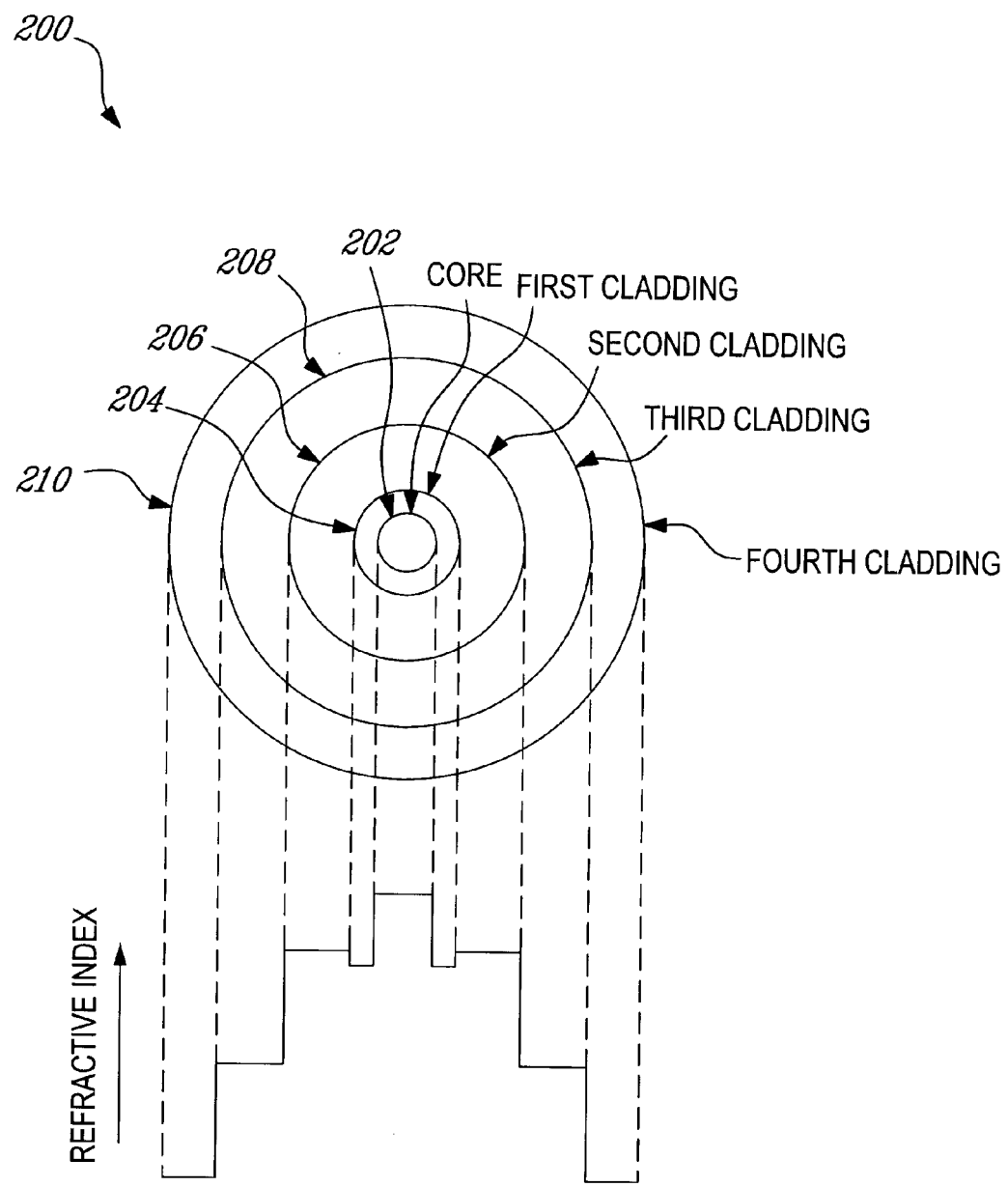
FIG. 4 is a sectional view of a multi-cladding optical fiber provided with a depressed first cladding according to a first illustrative embodiment of the present invention.

FIG. 4 illustrates a schematized cross sectional view and a schematic refractive index of a multi-cladding optical fiber 200 according to a first illustrative embodiment of the present invention. It includes a core 202, a depressed first cladding 204, a second cladding 206, an intermediate cladding in the form of a third cladding 208 and an external fourth cladding 210.

As can be seen from this figure, the first cladding 204 has a refractive index lower than the refractive index of the second cladding 206. This is referred herein as a depressed cladding.

The third cladding 208 constitutes an intermediate cladding. One skilled in the art will understand that more than one such intermediate cladding can be provided between the second cladding 206 and the external fourth cladding 210. These intermediate claddings are generally made out of glass and can be used to guide some of the high pump power thus limiting the pump power interacting with the external cladding 210.

The external fourth cladding 210 is generally made out of a low refractive index polymer.

Figure 5A:
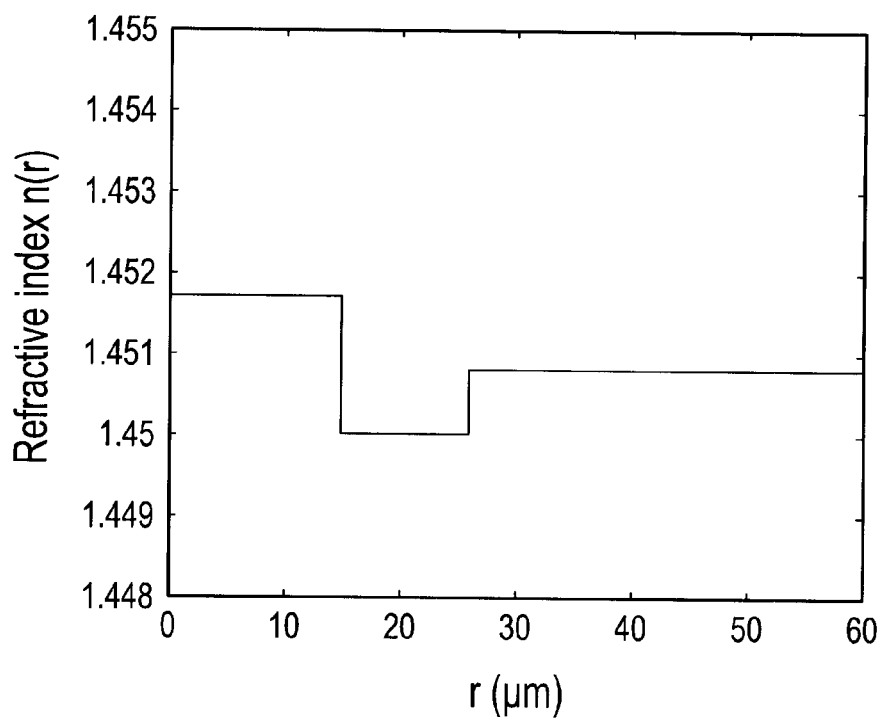
FIG. 5A illustrates the refractive index profile of the core and of the first cladding of the optical fiber of FIG. 4, assuming a circular symmetry; the core diameter of 30 microns is shown with a core NA of 0.07.
Figure 5B:
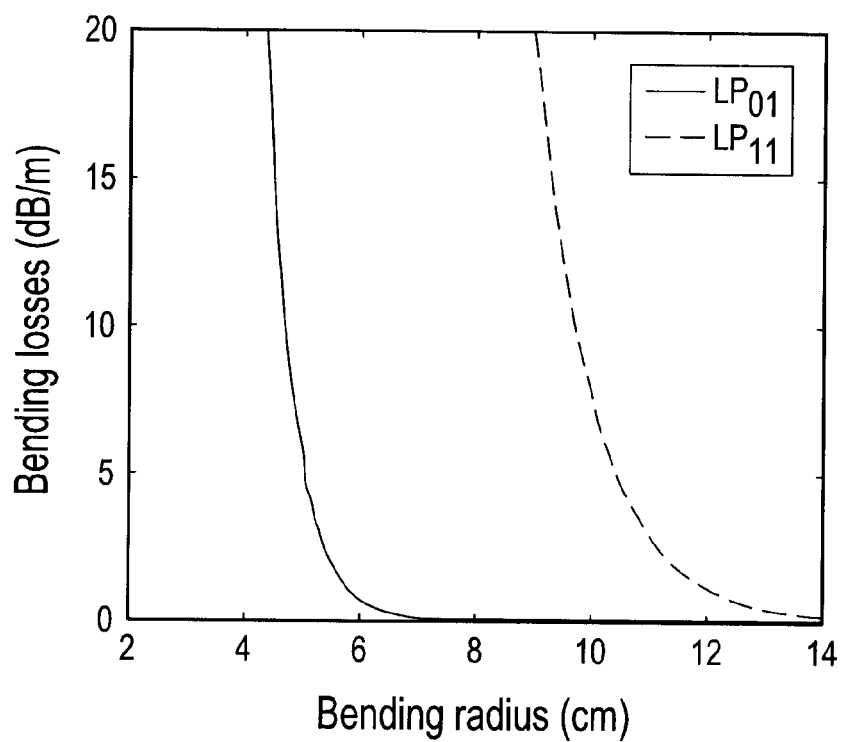
FIG. 5B is a graph illustrating the bending losses of the $LP_{01}$ and $LP_{11}$ modes as a function of the bending radius of the fiber of FIG. 5A.

FIG. 5A reproduces a portion of the depressed-cladding refractive index of FIG. 4 which takes advantage of the mode-dependent penetration depth of the evanescent field. Only the refractive indexes of the core 202 and the first two claddings 204 and 206 are illustrated in FIG. 5A. The core diameter is 30 μm and the core NA is 0.07. FIG. 5B illustrates the bending losses of this fiber with respect to the bending radius.

As can be seen in FIG. 5B, by appropriately choosing the depressed-cladding thickness, the difference in penetration depth can be optimized so as to increase the differential bending losses between the modes. In spite of a core NA which is the same as in the design of FIG. 3A, the depressed-clad design gives rise to significantly increased bending losses for the higher-order modes whose evanescent wave extends farther into the cladding.

Of course, the same graph shows that the fundamental mode also suffers increased bending losses, but the end result is a greatly improved margin of ~6 cm in bending radius (in comparison with ~1 cm for FIG. 3B) within which one can filter out the higher-order modes with limited impact on the $LP_{01}$ mode. The required larger bending radius for limiting the fundamental mode power loss might first appear as a drawback. But the possibility of filtering the higher-order modes at a larger bending radius might actually prove even more advantageous as it reduces bend-induced inter-modal coupling, as discussed in Laperle et al. [6].

Preform and Fiber Fabrication

The fabrication of the multi-cladding fiber 200 where the rare earth dopant of the core 202 is ytterbium (Yb) will now be briefly described.

The fabrication of the multi-cladding fiber 200 can be done using the conventional MCVD process or other technique such as outside vapor deposition (OVD), plasma-assisted deposition or nanoparticle technology.

The host material of the core and claddings is glass; silica being the most commonly used material. Other host materials may include fluoride glass or chalcogenide glass. While ytterbium has been mentioned hereinabove as the rare-earth dopant of the core of the fiber, other rare-earth elements, alone or in combination can be used and confined or not within the core. These rare-earth elements include erbium, neodymium, thulium and praseodymium, for example. To obtain the desired refractive index of the core and the claddings, other elements can be added. These elements may include aluminum, germanium, phosphorous, boron, and fluorine, for example. Finally the fourth external cladding 210 may include glass or low refractive index polymer. Index control can also be achieved by using the microstructure fiber technology. Hence, instead of a low-index polymer or Fluosil® glass, so-called air cladding can be considered as discussed in reference [10.]

Figure 6:
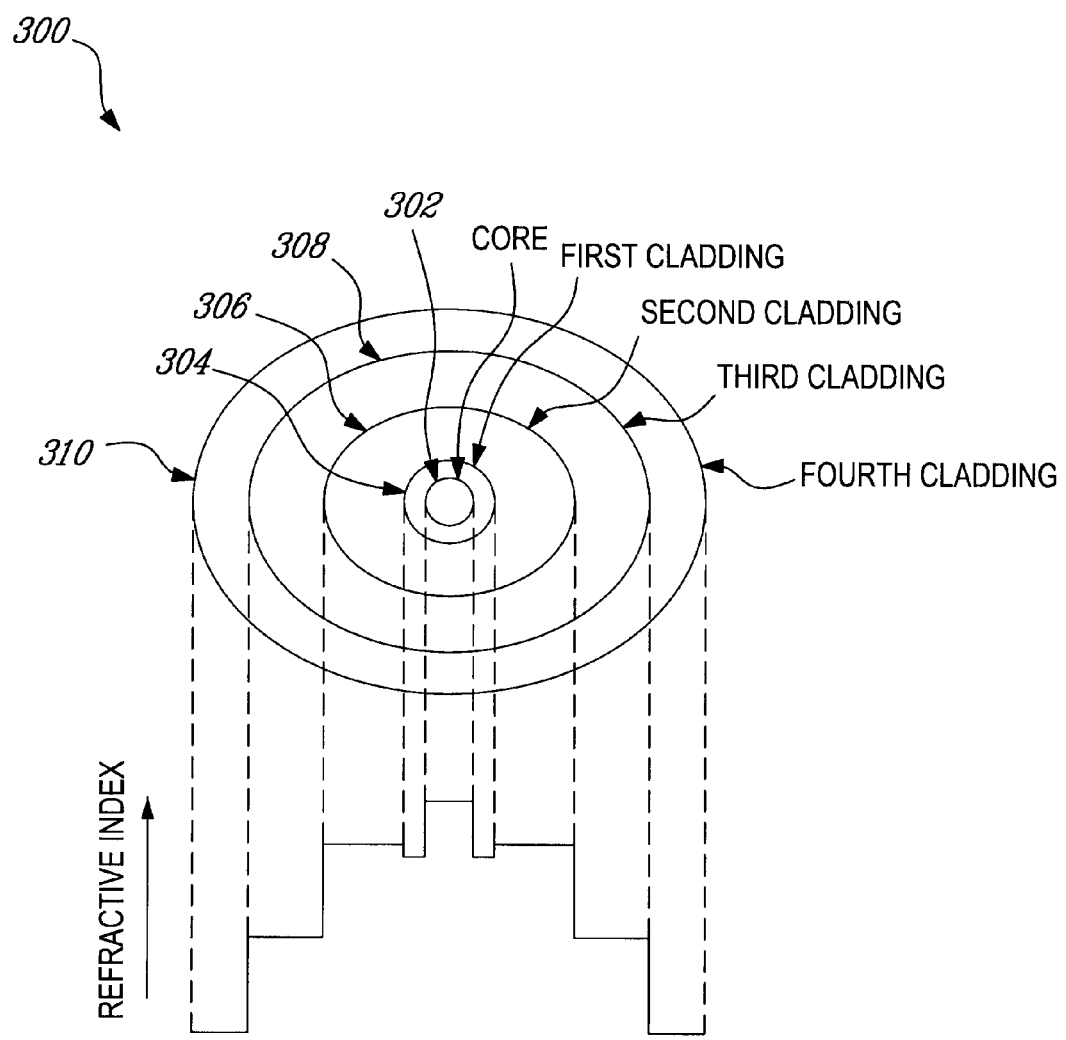
FIG. 6 is a sectional view of a non-circular multi-cladding optical fiber provided with a depressed first cladding according to a second illustrative embodiment of the present invention.

Turning now to FIG. 6 of the appended drawings a multi-cladding fiber 300 according to a second illustrative embodiment of the present invention will be briefly described. As can be seen from this figure, the core 302 and the first depressed cladding 304 have a circular cross section while the second, third and fourth claddings 306-310 have a generally oval cross section.

The non-circular shape of the second, third and fourth claddings as depicted in FIG. 6 serves to increase pump mode mixing and thus improve the pump power absorption by the core 302.

Figure 7A:
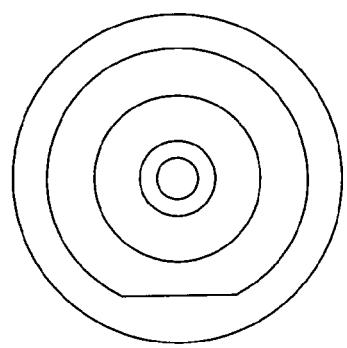
FIGS. 7A to 7C illustrate various cladding geometries.
Figure 7B:
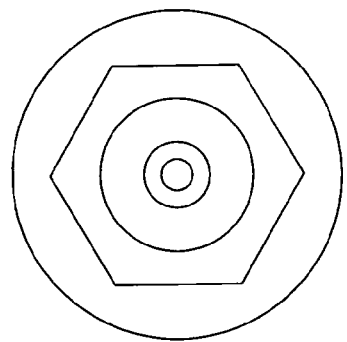
Figure 7C:
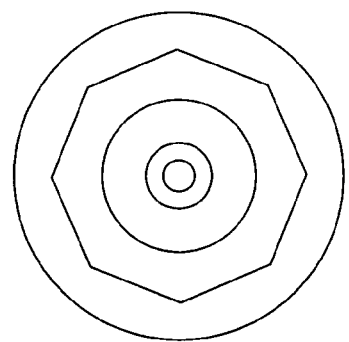

FIGS. 7A to 7C are schematic cross-sections illustrating multi-cladding fibers having non-circular third claddings. More specifically, the fiber of FIG. 7A has a D-shape third cladding; the fiber of FIG. 7B has a hexagonal-shape third cladding and the fiber of FIG. 7C has an octagonal-shape third cladding. One skilled in the art will understand that other irregular shapes can be used. The non-circular third claddings of FIGS. 7A to 7C increase the pump mode mixing and thus improve the pump power absorption by the core [11].

Figure 8:
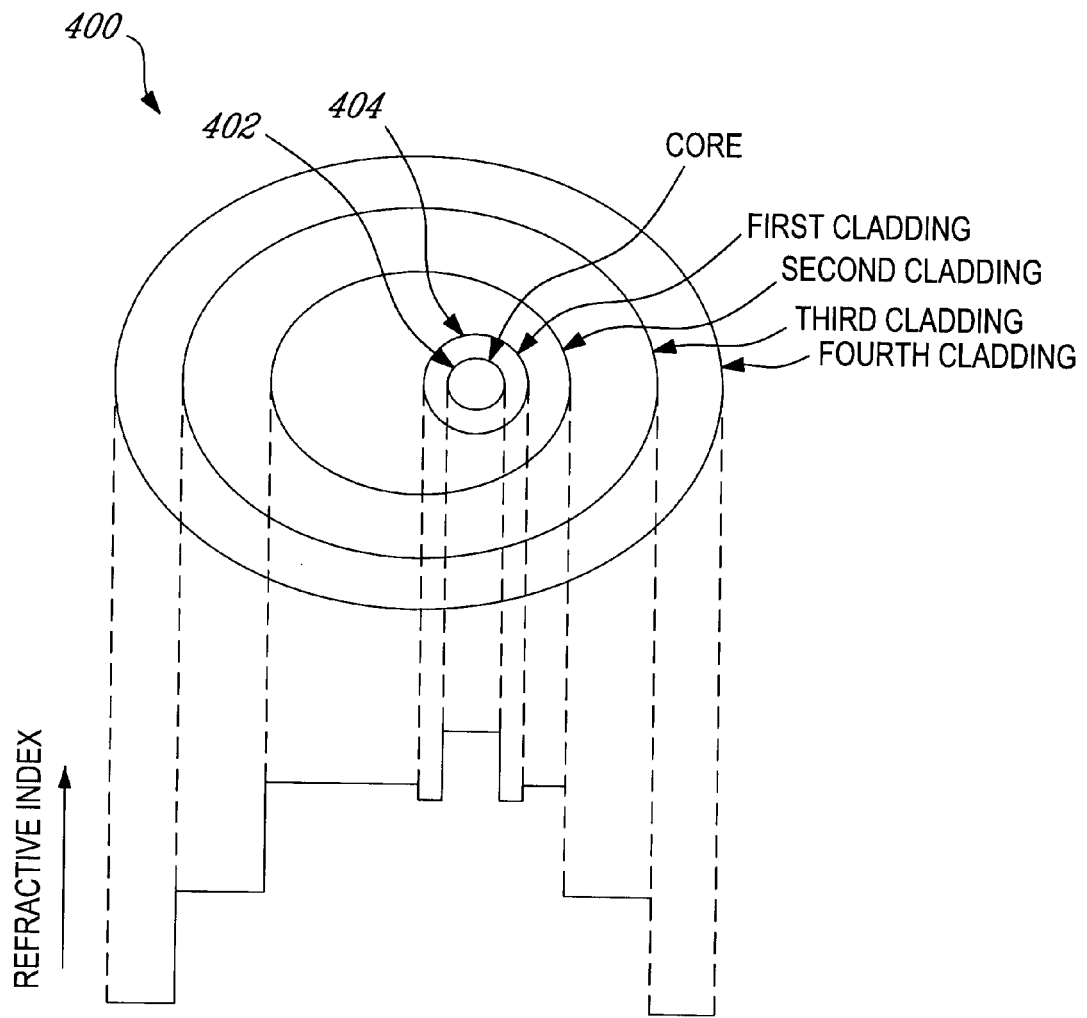
FIG. 8 is a sectional view of a multi-cladding optical fiber provided with a depressed first cladding and an offset core according to a third illustrative embodiment of the present invention, along with a corresponding stair-like index profile.

The multi-cladding fiber 400 of FIG. 8 is similar to the fiber 300 of FIG. 6. The main difference is the off-center location of the core 402 and the depressed first cladding 404. This off-center core 402 and first cladding 404 also favors higher pump absorption as discussed in reference [12].

Figure 9:
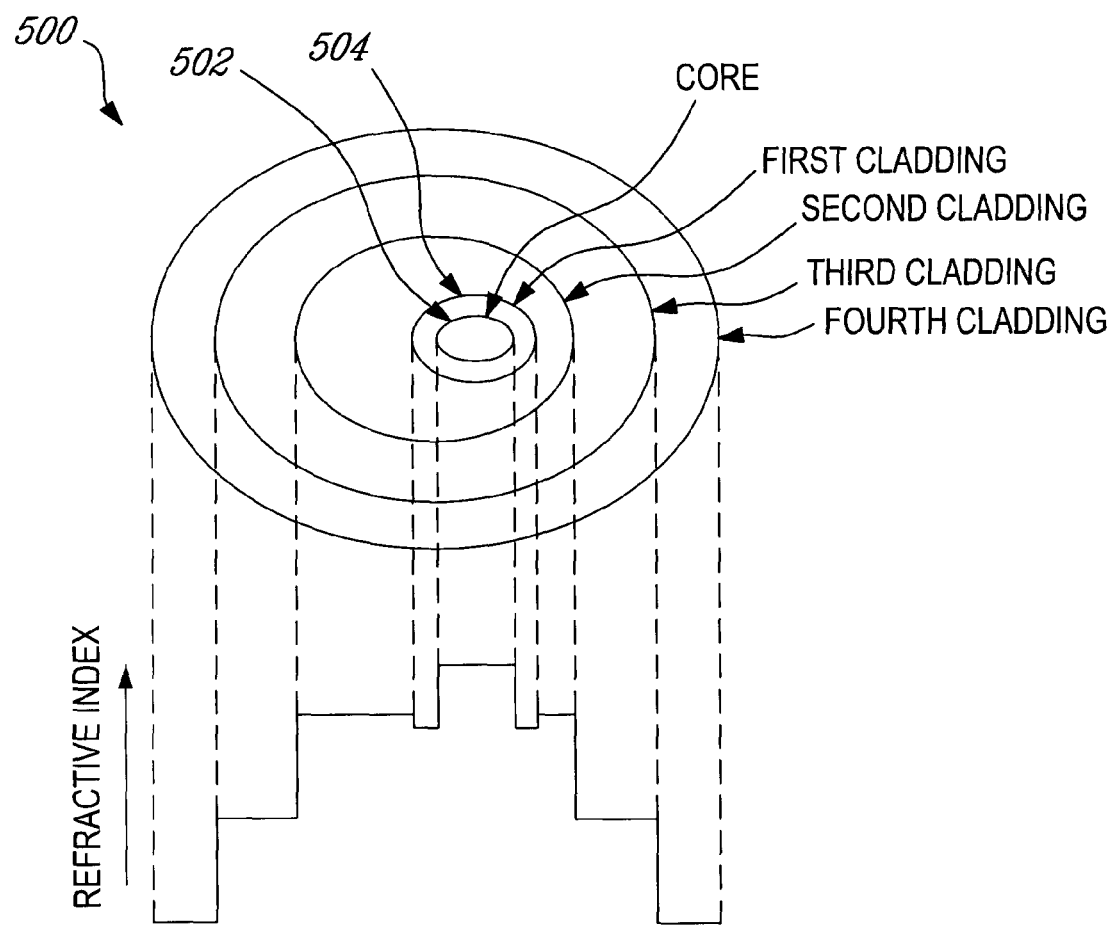
FIG. 9 is a sectional view of a generally non-circular multi-cladding optical fiber provided with a depressed first cladding and an offset core according to a fourth illustrative embodiment of the present invention.

The multi-cladding fiber 500 of FIG. 9 is similar to the fiber 400 of FIG. 8. The main difference is the oval shape of the core 502 and depressed first cladding 504 that further enhances pump mode mixing.

Figure 10:
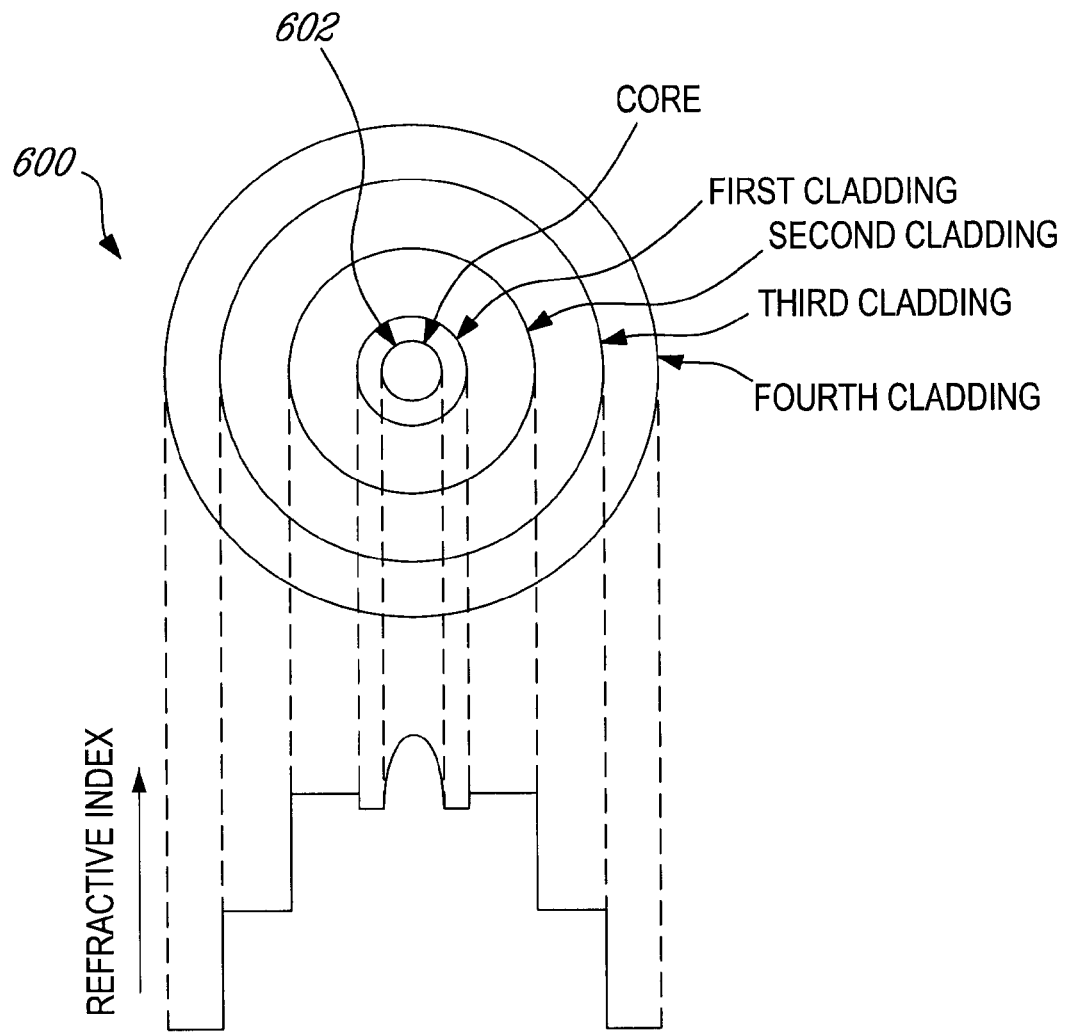
FIG. 10 is a sectional view of a multi-cladding optical fiber provided with a depressed first cladding and a graded-index core according to fifth illustrative embodiment of the present invention, along with a corresponding stair-like index profile.

It is to be noted that the core index profile is not limited to a step-index like dopant distribution. In other words, the uniform refractive index profile of the core illustrated in FIGS. 4 to 9 could be varied. A core having a parabolic refractive index profile or, more generally, a graded refractive index profile, for example, could also benefit from a depressed-cladding design. FIG. 10 illustrates a multi-cladding fiber 600 where the core 602 has a graded refractive index profile. The principal interest for such a graded refractive index profile is to limit the distortion in beam shape imparted to the fundamental mode by coiling the fiber, as discussed by Fini [13].

It is to be noted that the number of claddings surrounding the core could be varied depending on the intended application of the fiber. For example, a triple-clad fiber, illustrated in FIG. 11, would also benefit from the new depressed clad design for enhancing differential bending losses.

Figure 11:
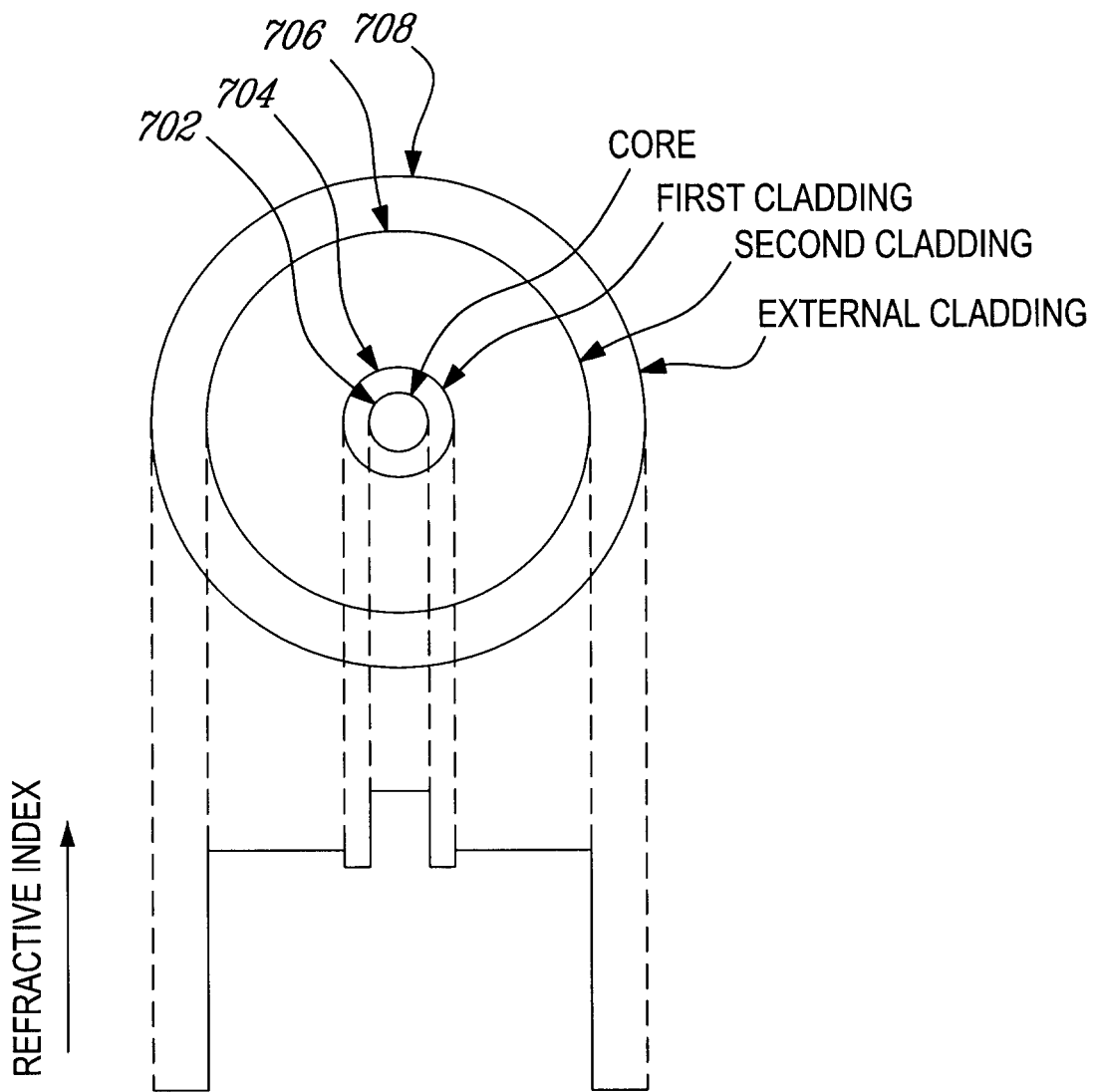
FIG. 11 is a sectional view of a triple-clad optical fiber provided with a depressed first cladding according to a sixth illustrative embodiment of the present invention, along with a corresponding stair-like index profile.

More specifically, FIG. 11 illustrates a triple-clad fiber 700 provided with a core 702, a first depressed cladding 704, a second cladding 706 and an external third cladding 708.

Furthermore, any of the fibers discussed hereinabove could be polarization maintaining. Known techniques to induce birefringence in the fibre, such as an elliptic core, an elliptic cladding, the panda configuration and the bow-tie configuration, for example, can be used. If some stress-applying parts are used, they can be contained inside a single cladding or they can span more than one cladding.

The depressed-cladding design described hereinabove improves the standard multi-cladding design by extending the applicability of mode filtering through bending losses to larger core sizes.

Furthermore, the geometry of the illustrative embodiments of the present invention is well suited to tailor the optical and acoustic properties of the fiber. By using the right dopants in the core and first cladding, the overlap between the optical and acoustic fields distributions can be reduced significantly, thus increasing the SBS threshold as discussed in references [2, 14].

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

REFERENCES

1. W. Torruellas, Y. Chen, B. McIntosh, J. Farroni, K. Tankala, S. Webster, D. Hagan, M. J. Soileau, M. Messerly, and J. Dawson, "High peak power ytterbium doped fiber amplifiers," SPIE Vol. 6102, Fiber Lasers III: Technology, Systems, and Applications, 6102-24, 2006.
2. D. Walton, S. Gray, J. Wang, M.-J. Li, X. Chen, A. B. Ruffin, J. Demeritt, and L. Zenteno, "High power, narrow linewidth fiber lasers," SPIE Vol. 6102, Fiber Lasers III: Technology, Systems, and Applications, 6102-05, 2006.
3. J. P. Koplow, D. A. V. Kliner, and L. Goldberg, "Single-mode operation of a coiled multimode fiber amplifier," Opt. Lett. 25(7), pp. 442-444, 2000.
4. J. M. Sousa and O. G. Okhotnikov, "Multimode Er-doped fiber for single-transverse-mode amplification," Appl. Phys. Lett. 74(11), pp. 1528-1530, 1999.
5. J. Limpert, H. Zellmer, A. Tünnermann, T. Pertsch and F. Lederer, "Suppression of higher order modes in a multi-mode fiber amplifier using efficient gain-loss management (GLM)," in Advanced Solid-State Laser Conference 2002, Québec City, Canada, paper MB20.
6. P. Laperle, C. Paré, H. Zheng and A. Croteau, "Yb-doped LMA triple-clad fiber for power amplifiers", SPIE Vol. 6453, Fiber Lasers IV: Technology, Systems, and Applications, 645308, 2007.
7. Lauzon, J and Croteau, A., "Triple-clad rare-earth doped optical fiber and applications," U.S. Pat. No. 6,941,053, Sep. 6, 2005.
8. A. Croteau, C. Paré, H. Zheng, P. Laperle, and Y. Taillon, "Bending Insensitive, Highly Yb-Doped LMA Triple-Clad Fiber for Nearly Diffraction-Limited Laser Output," SPIE Vol. 6101, Laser Beam Control and Applications, 61010G, 2006.
9. P. Laperle, C. Paré, H. Zheng, A. Croteau, and Y. Taillon, "Yb-doped LMA triple-clad fiber laser," SPIE Vol. 6343, Photonics North 2006, 63430X, 2006.
10. J. Limpert, N. Deguil-Robin, I. Manek-Hönninger, F. Salin, F. Röser, A. Liem, T. Schreiber, S. Nolte, H. Zellmer, A. Tünnermann, J. Broeng, A. Petersson, and C. Jakobsen, "High-power rod-type photonic crystal fiber laser," Opt. Express 13, 1055-1058, 2005.
11. C. Paré, "Influence of inner-cladding shape and stress-applying parts on the pump absorption of a double-clad fiber amplifier", SPIE Vol. 5260, Applications of Photonic Technology 6, pp. 272-277, 2003.
12. A. Liu and K. Ueda, "The absorption efficiency of circular, offset, and rectangular double-clad fibers", *Opt. Commun.* 132, 511-518, 1996.
13. J. M. Fini, "Bend-resistant design of conventional and microstructure fibers with very large mode area,", Opt. Express 14, 69-81, 2006.

14. P. D. Dragic, C.-H. Liu, G. C. Papen, and A. Galvanauskas, "Optical fiber with an acoustic guiding layer for stimulated Brillouin scattering suppression," in CLEO 2005, paper CThZ3, 2005.

What is claimed is:

1. A multi-cladding large-core multimode optical fiber comprising:
   a longitudinally extending multimode core with low numerical aperture having at least a portion thereof that is rare-earth doped, the core having a core refractive index and a diameter, the diameter being at least 30 µm;
   a first cladding surrounding the longitudinally extending core, the first cladding having a first cladding refractive index lower than the core refractive index;
   a second cladding surrounding the first cladding, the second cladding having a second cladding refractive index higher than the first cladding refractive index and lower than the core refractive index;
   at least one intermediate cladding surrounding the second cladding; and
   an external cladding surrounding the at least one intermediate cladding, the external cladding having an external cladding refractive index lower than the second cladding refractive index,
   whereby, for a given diameter of the core, a margin is increased between a first bending radius causing a threshold bending loss in a fundamental mode of the optical fiber and a second bending radius causing the threshold bending loss in higher-order modes of the optical fiber.

2. The multi-cladding multimode optical fiber of claim 1, wherein the core has a numerical aperture in the range of about 0.05 to about 0.07.

3. The multi-cladding multimode optical fiber of claim 1, wherein the longitudinally extending core and the first cladding have a generally circular cross-section.

4. The multi-cladding multimode optical fiber of claim 3, wherein the second cladding, the at least one intermediate cladding, and the external cladding have a non-circular cross-section.

5. The multi-cladding multimode optical fiber of claim 1, wherein the longitudinally extending core and the first cladding have a generally oval cross-section.

6. The multi-cladding multimode optical fiber of claim 5, wherein the second cladding, the at least one intermediate cladding, and the external cladding have a generally circular cross-section.

7. The multi-cladding multimode optical fiber of claim 1, wherein the longitudinally extending core is offset with respect to a longitudinal axis of the optical fiber.

8. The multi-cladding multimode optical fiber of claim 1, wherein the at least one intermediate cladding has an intermediate cladding refractive index lower than the second cladding refractive index and higher than the external cladding refractive index.

9. The multi-cladding multimode optical fiber of claim 1, wherein the at least one intermediate cladding has a non-circular cross-section.

10. The multi-cladding multimode optical fiber of claim 1, wherein the core is made of glass and comprises an element selected from the group consisting of aluminum, germanium, phosphorus, boron and fluorine.

11. The multi-cladding multimode optical fiber of claim 10, wherein the glass is selected from the group consisting of silica, fluoride glass and chalcogenide glass.

12. The multi-cladding multimode optical fiber of claim 1, wherein the rare-earth dopant comprises an element selected from the group consisting of ytterbium, erbium, neodymium, thulium and praseodymium.

13. The multi-cladding multimode optical fiber of claim 1, wherein the first and second claddings are made of glass and independently comprise an element selected from the group consisting of aluminum, germanium, phosphorus, boron and fluorine.

14. The multi-cladding multimode optical fiber of claim 13, wherein the glass is selected from the group consisting of silica, fluoride glass and chalcogenide glass.

15. The multi-cladding multimode optical fiber of claim 1, wherein the external cladding includes a low refractive index polymer.

16. The multi-cladding multimode optical fiber of claim 8, wherein the at least one intermediate cladding comprises an element selected from the group consisting of glass and low refractive index polymers.

17. The multi-cladding multimode optical fiber of claim 1, wherein the core refractive index has a generally uniform profile.

18. The multi-cladding multimode optical fiber of claim 1, wherein the core refractive index has a generally graded profile.

19. The multi-cladding multimode optical fiber of claim 1, wherein the core refractive index has a generally parabolic profile.

20. The multi-cladding multimode optical fiber of claim 1, wherein the fiber is configured as to be polarization maintaining using a configuration selected from the group consisting of an elliptic core, an elliptic cladding, a panda configuration and a bow-tie configuration.

* * * * *